(12) United States Patent  (10) Patent No.: US 9,189,293 B2
Inoue et al.  (45) Date of Patent: Nov. 17, 2015

(54) COMPUTER, VIRTUALIZATION MECHANISM, AND SCHEDULING METHOD

(71) Applicant: Hitachi, Ltd., Tokyo (JP)

(72) Inventors: Hironori Inoue, Nerima (JP); Shuhei Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 277 days.

(21) Appl. No.: 13/908,609

(22) Filed: Jun. 3, 2013

(65) Prior Publication Data

US 2013/0347000 A1   Dec. 26, 2013

(30) Foreign Application Priority Data

Jun. 4, 2012 (JP) ................................. 2012-127419

(51) Int. Cl.
*G06F 9/455* (2006.01)
*G06F 9/50* (2006.01)

(52) U.S. Cl.
CPC .............. *G06F 9/5077* (2013.01); *G06F 9/505* (2013.01)

(58) Field of Classification Search
None
See application file for complete search history.

(56) References Cited

U.S. PATENT DOCUMENTS

| 5,522,070 A * | 5/1996 | Sumimoto .................... 718/104 |
| 7,865,663 B1 * | 1/2011 | Nelson et al. ................ 711/112 |
| 2005/0132365 A1 * | 6/2005 | Madukkarumukumana et al. ................................ 718/1 |
| 2005/0160423 A1 * | 7/2005 | Bantz et al. ....................... 718/1 |
| 2007/0300223 A1 * | 12/2007 | Liu .................................. 718/1 |
| 2009/0276771 A1 * | 11/2009 | Nickolov et al. ............. 717/177 |
| 2012/0030675 A1 | 2/2012 | Hayakawa et al. |
| 2012/0096293 A1 * | 4/2012 | Floyd et al. .................... 713/323 |
| 2012/0185851 A1 * | 7/2012 | Zhang et al. ...................... 718/1 |
| 2013/0268940 A1 * | 10/2013 | Gmach et al. ................ 718/104 |

FOREIGN PATENT DOCUMENTS

JP   2008-186136 A   8/2008

* cited by examiner

*Primary Examiner* — Kenneth Tang
(74) *Attorney, Agent, or Firm* — Foley & Lardner LLP

(57) ABSTRACT

Computer including a plurality of physical CPUs, a plurality of virtual computers which execute predetermined processing and to which one of the plurality of physical CPUs is assigned, and a virtual computer control component able to cause the plurality of physical CPUs to execute overhead processing required by plurality of virtual computers. Virtual computer control component configured to: (A) upon causing the physical CPU, in which processing of the virtual computer is in a running state, to execute overhead processing, measure a run time used by the physical CPU to manage a cumulative run time, for each of the physical CPUs; and (B) upon causing the overhead processing to be executed subsequent to the (A), select a physical CPU in which the cumulative run time is smallest as the physical CPU to execute the overhead processing.

11 Claims, 11 Drawing Sheets

COMPUTER, VIRTUALIZATION MECHANISM, AND SCHEDULING METHOD

CROSS-REFERENCE TO PRIOR APPLICATION

This application relates to and claims the benefit of priority from Japanese Patent Application number 2012-127419, filed on Jun. 4, 2012 the entire disclosure of which is incorporated herein by reference.

BACKGROUND

In recent years, server virtualization of partitioning the hardware resource of a high-performance computer to obtain partitions in units referred to as virtual machine (VM), and operating each of those partitions as a single server has been put into practical use. Server virtualization is classified into a hypervisor-type and a host OS-type based on the operating environment of the VM. The former is a method of operating a plurality of VMs on a special management program (hypervisor) which exists on a bare machine. The latter is a method of running a management program on a standard OS (host OS) as one application, and operating the VM thereon. In either of the methods described above, server partitioning includes a control unit (virtual computer control unit) referred to as virtual machine monitor (VMM) and the VM that operates thereon. The VM is referred to as a "virtual computer", and the OS that runs thereon is referred to as a "guest OS". The operation of the guest OS is functionally the same as the operation on a server that is not subject to server partitioning.

The VMM mainly governs the processing of "command emulation", "memory management", "I/O control", and "process scheduling". Since the VM shares and uses the resources of a physical computer, the processing governed by the VMM includes share processing that is required by the respective VMs. Generally speaking, this kind of overhead processing must be processed in preference to the processing of the respective VMs. As a scheduling method for preferentially performing the share processing, an event driven method is generally adopted. With the event driven method, the overhead processing is generally in a waiting state, is activated upon receiving an event notification and, once the requested processing is completed, once again returns to the waiting state.

In the scheduling method of the overhead processing governed by the VMM, there is an issue of how to select the physical CPU to execute the overhead processing when all physical CPUs are in a RUN state of executing the processing of the VM or the VMM. If the selection of the physical CPU is not performed properly, the share processing of the VMM will monopolize the resource of the physical CPU, which is assigned for the VM processing, for a long period of time, and there is a possibility that the processing of the VM cannot be continued.

As a method for resolving the foregoing problem, Japanese Patent Application Laid-open No. 2008-186136 discloses a method of introducing a time sharing system to the overhead processing of the VMM, and additionally using the number of times that the overhead processing of the VMM had run on the physical CPU in a RUN state as information for selecting the physical CPU so as to execute the overhead processing of the VMM equally with all physical CPUs. Note that, when processing is executed by a physical CPU, this is also sometimes referred to as the processing being run on a physical CPU.

SUMMARY

The problems to be solved by the present invention are now explained with reference to the appended drawings.

FIG. 9 is a conceptual diagram showing the scheduling operation of the VMM process. FIG. 9 (a1) shows the scheduling operation disclosed in Japanese Patent Application Laid-open No. 2008-186136 of selecting the physical CPU by introducing the time sharing system, and using the information related to the number of times that the VMM process (overhead processing of VMM) has run on a physical CPU in a RUN state.

Here, in FIG. 9, the inverted triangles indicate a VMM event notification (request), the number above an inverted triangle indicates a request number of the VMM event, and the number in an inverted triangle indicates the length of the VMM processing (length of time required for executing the processing). In this diagram, for instance, the length 1 indicates the length of one time slice in time sharing. Moreover, the rectangles with SW indicated therein indicate the switching of the process (processing). The shaded rectangles indicate the processing (overhead processing) to be performed in response to the VMM event request, and the number in a shaded rectangle indicates the request number. Moreover, in this diagram, as a premise, let it be assumed that the computer includes three physical CPUs (physical CPU 0, physical CPU 1, physical CPU 2), the three physical CPUs are all in a RUN state of executing the processing of the VM, and the VM that is running exclusively on the physical CPU 0 will issue an event notification of the VMM process (overhead processing).

The overhead processing of the VMM performed in response to an event notification 800 (request 1) is executed by the physical CPU 0, and, when the unit time (time slice) of time sharing elapses, is executed upon switching from the physical CPU 0 to the physical CPU 1, and thereafter ended. Here, when the overhead processing of the VMM is executed upon switching from the physical CPU 0 to the physical CPU 1, switching from the overhead processing of the VMM to the processing of the VM occurs in the physical CPU 0, and switching from the processing of the VM to the overhead processing of the VMM occurs in the physical CPU 1. Since the overhead processing of the VMM performed in response to an event notification 801 (request 2) starts running on a physical CPU in which the number of times that the overhead processing was run thereon is fewest among the physical CPUs in a RUN state, the overhead processing start running on the physical CPU 2. The overhead processing of the VMM performed in response to the request 2 is executed, when the time slice of time sharing has elapsed, by being switched from the physical CPU 2 to the physical CPU 1, and similarly executed by being switched from the physical CPU 1 to the physical CPU 2, and executed by being switched from the physical CPU 2 to the physical CPU 0, and is thereafter ended. Moreover, since the overhead processing of the VMM performed in response to an event notification 802 (request 3) starts running on a physical CPU in which the number of times that the overhead processing was run thereon is fewest among the physical CPUs in a RUN state, the overhead processing start running on the physical CPU 1. The overhead processing of the VMM performed in response to the request 3 is executed, when the time slice of time sharing has elapsed, by being switched from the physical CPU 1 to the physical CPU 2, and similarly executed by being switched from the physical CPU 2 to the physical CPU 0, and is thereafter ended.

In order to switch the physical CPU to execute the overhead processing, costs will arise for switching the processing of the VM and the overhead processing of the VMM in the physical CPU before the switch and in the physical CPU after the switch. In time sharing, switching is performed when the overhead processing is run on the physical CPU for the length of a time slice, but costs are required each time the physical CPU to succeed the subsequent running of the overhead processing is selected and each time the processing is switched. In other words, the technology of Japanese Patent Application Laid-open No. 2008-186136 is not necessarily effective in terms of performance since the overhead processing of the VMM, which is of high priority, is interrupted during time sharing, and costs for switching between the processing of the VM and the overhead processing of the VMM and costs for causing the overhead processing of the VMM to be succeeded by the subsequent physical CPU will consequently arise.

The present invention was devised in view of the foregoing problems, and an object of this invention is to provide technology capable of securing, under circumstances where a plurality of physical CPUs are in a RUN state, the uniformity of the time that the resources of these physical CPUs are used by the overhead processing of the VMM, and reducing the costs required for switching between the processing of the VM and the overhead processing of the VMM.

The computer of the present invention includes a plurality of physical CPUs, a plurality of virtual computers which execute predetermined processing and to which one of the plurality of physical CPUs is assigned, and a virtual computer control component for managing the plurality of virtual computers, the virtual computer control component being able to cause the plurality of physical CPUs to execute overhead processing which is required by the plurality of virtual computers.

The virtual computer control component is configured to (A) upon causing the physical CPU, in which processing of the virtual computer is in a running state, to execute the overhead processing, measure a run time used by the physical CPU to execute the overhead processing, and manage a cumulative run time, which is an accumulation of the run time, for each of the physical CPUs, and (B) upon causing the overhead processing to be executed subsequent to the (A), select a physical CPU in which the cumulative run time is smallest as the physical CPU to execute the overhead processing.

Under circumstances where a plurality of physical CPUs are in a RUN state, the overhead processing of the VMM of higher priority than the processing of the VM is executed equally by a plurality of physical CPUs at a low cost. It is thereby possible to prevent the processing of the VM, which was assigned to a physical CPU, from not being able to run for a long period of time, and decrease extra costs related to the processing of the VMM.

DETAILED DESCRIPTION OF THE EMBODIMENT

Embodiments of the present invention are now explained with reference to the appended drawings. Note that the embodiments explained below are not intended to limit this invention claimed in the scope of claims, and the various elements and their combinations explained in the embodiments are not necessarily all essential as means for solving the problems to be solved by this invention.

Note that, in the ensuing explanation, various types of information may be explained using expressions such as "aaa table" or "aaa block", but the various types of information may also be expressed as a data structure other than tables and blocks. In order to indicate that certain information is not dependent on a data structure, the "aaa table" or "aaa block" may also be referred to as "aaa information".

Moreover, in the ensuing explanation, there may be cases where processing is explained with a program (or a partial functional part thereof) as the subject, since a program performs predetermined processing by being executed by a processor (for instance, a physical central processing unit (CPU)) while using storage resources (for instance, a memory) and a communication control apparatus (for instance, a port) as needed, the subject of the processing may also be a processor. Moreover, processing that is explained with a program as the subject may also be processing that is performed by a processor or a device (for instance, a computer) comprising that processor. Moreover, a part or the whole of the program may be realized by dedicated hardware. Moreover, a computer program may be installed from a program source to the respective devices. A program source may also be, for example, a program deployment server or storage media.

Outline of an embodiment is foremost explained.

In this embodiment, as the method of scheduling (selecting) the physical CPU for running the overhead processing of the VMM, rather than using the number of times that the overhead processing was run on the physical CPU in a RUN state, used is the cumulative running time that the overhead processing was run on the physical CPU in a RUN state (cumulative take-over running time). Consequently, in a computer in which a plurality of physical CPUs are in a RUN state, the overhead processing of the VMM of higher priority than the processing of the VM is executed equally by a plurality of physical CPUs at a low cost. It is thereby possible to prevent the processing of the VM, which was assigned to a physical CPU, from not being able to run for a long period of time, and decrease extra costs related to the processing of the VMM.

Another object of the present invention is now explained with reference to FIG. 9 (b1).

Figure 9A:
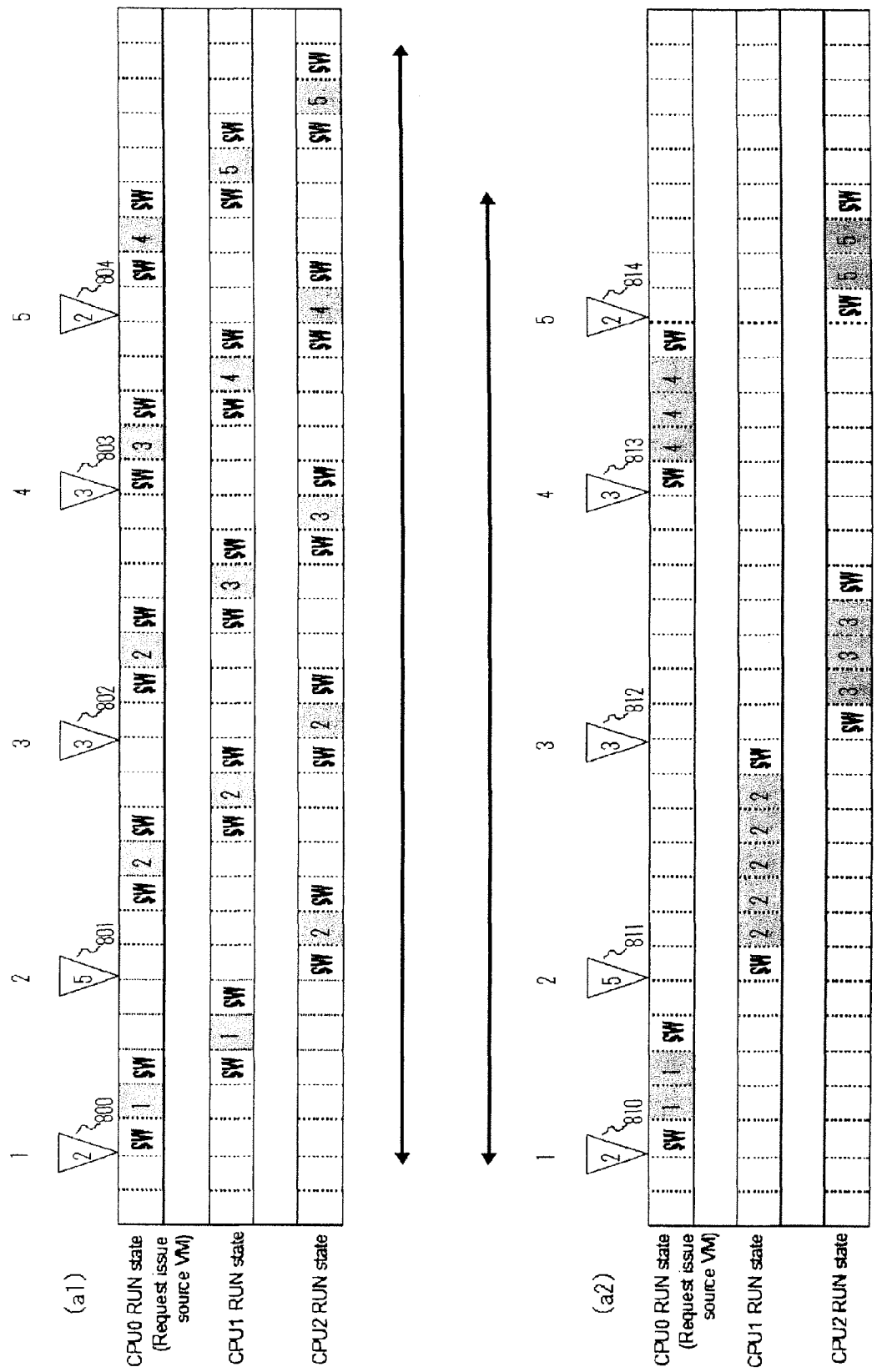
FIG. 9, comprising 9A, 9B and 9C, is a conceptual diagram showing the scheduling operation of the VMM process.
Figure 9B:
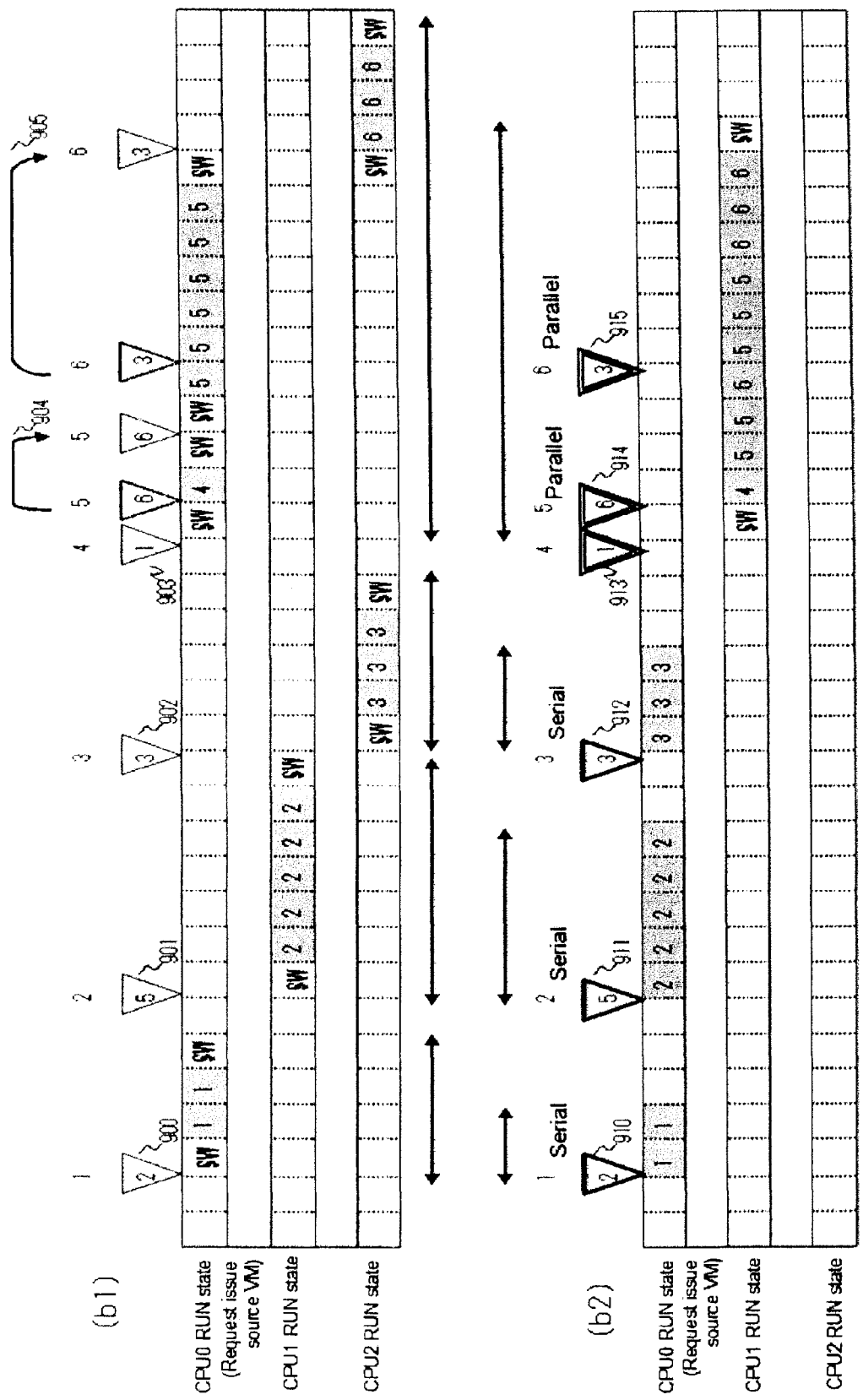
Figure 9C:
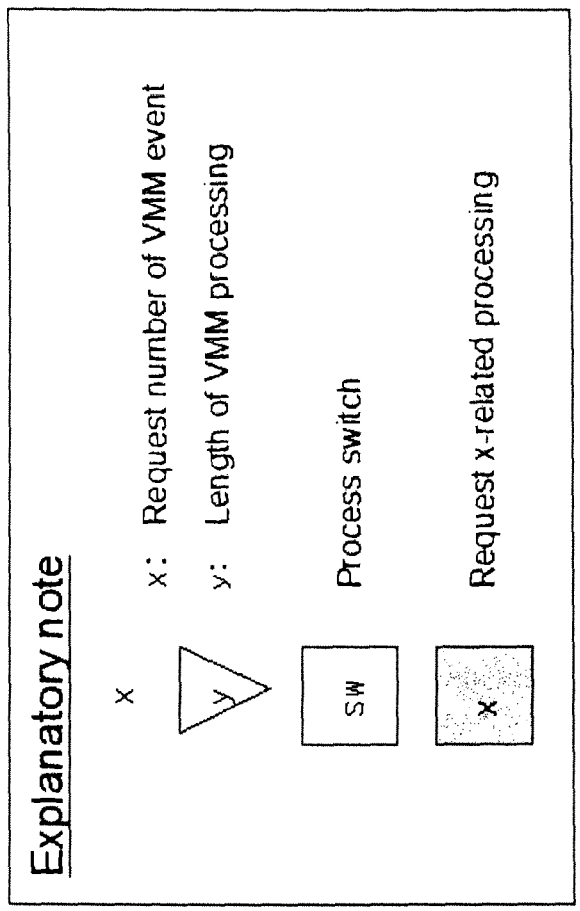

FIG. 9 (b1) shows the scheduling operation in a case of not using a time sharing system in order to cut costs required for the selection of the physical CPU and the switching of processing in comparison to the scheduling operation shown in FIG. 9 (a1). Note that, in order to secure the uniformity of the time that the resources of these physical CPUs are used by the overhead processing of the VMM, the physical CPU with the smallest cumulative time (cumulative take-over running time) that the overhead processing of the VMM was run on the physical CPU in a RUN state is selected as the physical CPU to execute the overhead processing of the VMM.

The execution of the overhead processing of the VMM in response to an event notification 900 (request 1) is started with the physical CPU 0, and continued until the processing is ended. The execution of the overhead processing of the VMM in response to an event notification 901 (request 2) is started with the physical CPU 1, and continued until the processing is ended. The execution of the overhead processing of the VMM in response to an event notification 902 (request 3) is started with the physical CPU 2, and continued until the processing is ended. The execution of the overhead processing of the VMM in response to an event notification 903 (request 4) is started with the physical CPU 0 with the smallest cumulative time that the overhead processing of the VMM was run on the physical CPU in a RUN state, and continued until the overhead processing is ended.

Here, at the timing that the VM is to issue an event notification 904 (request 5), there is a possibility that the physical CPU 0 may be executing the overhead processing of the VMM in response to the request 4. In the foregoing case, the issuance of the event notification 904 will be delayed up to the timing that the VM is run again on the physical CPU 0, and consequently the time until the event is processed will also be delayed. In other words, when the overhead processing of the VMM is activated upon receiving the event notification of the processing of the VM, the activation of the request of the subsequent overhead processing of the VMM will be delayed as a result of the overhead processing of the VMM interrupting the processing of the VM, and this will lead to the deterioration in the performance.

Thus, in this embodiment, a serial attribute or a parallel attribute is assigned to the overhead processing of the VMM, and the method of selecting the physical CPU for running the overhead processing of the VMM is changed according to the attribute. Here, a serial attribute indicates that it is an overhead processing of the VMM in which an event notification is issued only once from a notification source process, or an overhead processing of the VMM which is periodically activated with a timer, and a parallel attribute indicates that it is an overhead processing of the VMM in which an event notification is issued in continuation from the VM. In this embodiment, with respect to the overhead processing of the VMM of a parallel attribute, a physical CPU that is different from the physical CPU to execute the VM to issue the event notification is selected as the physical CPU to execute the overhead processing. Consequently, with respect to the overhead processing of the VMM that is activated by receiving, in continuation, an event notification from the VM, a plurality of physical CPUs can be used for issuing the event notification and executing the overhead processing of the VMM in parallel, and thus the performance can be improved since there will be no delay in the issuance of the event notification and the activation of the overhead processing.

Figure 1:
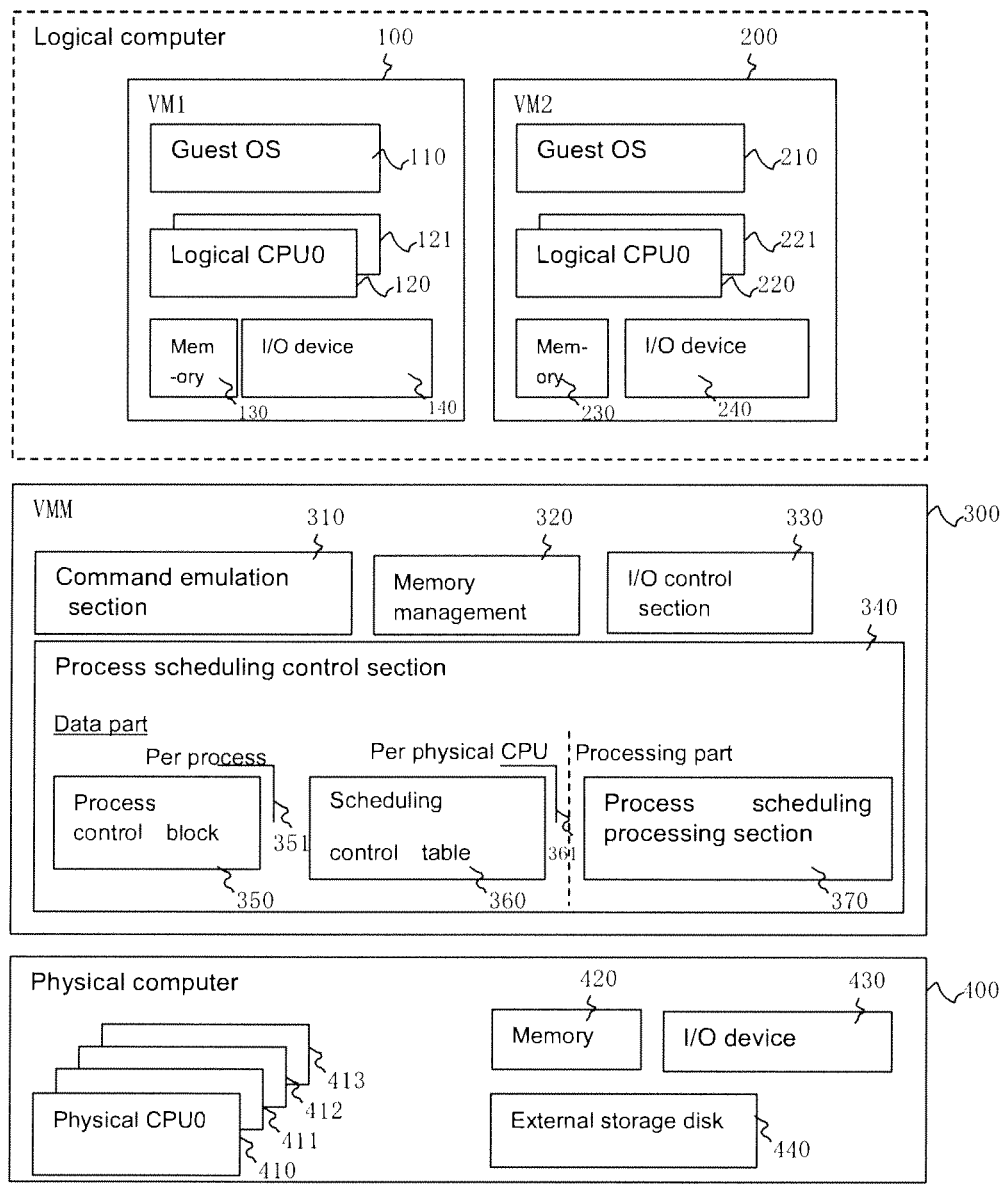
FIG. 1 is a configuration diagram of the computer according to an embodiment.

FIG. 1 is a configuration diagram of the computer according to an embodiment.

A computer (physical computer) 400 includes, as hardware resources, a plurality of physical CPUs 410 to 413, a memory 420, an I/O device 430, and an external storage disk 440. The physical CPUs 410 to 413 execute various types of processing. The memory 420 stores various programs to be executed by the physical CPUs 410 to 413, and data to be used in the execution of the various programs. The memory 420 stores, for instance, a VMM 300. The I/O device 430 includes input devices such as a keyboard, a mouse and the like for inputting information, and an output device such as a display for outputting various types of information. The external storage disk 440 stores various types of data.

The VMM 300 is software that runs on the computer 400; that is, software that is executed by the physical CPUs 410 to 413. The VMM 300 has a function of logically partitioning the hardware resources of the physical computer 400 to create VMs 100, 200, and managing and controlling the same. The VMM 300 mainly includes function parts such as a command emulation unit 310, a memory management unit 320, an I/O control unit 330, and a process scheduling control unit 340. As a result of these function parts being executed by the physical CPUs 410 to 413, the constituent elements of the VMs 100, 200 such as logical CPUs 120, 121, 220, 221, logical memories 130, 230 for the VM, logical I/O devices 140, 141 and the like are created. It is thereby possible to run guest OSes 110, 210 on the respective VMs 100, 200. The VMM 300 is a so-called virtualization mechanism.

Here, the logical partitioning of a physical CPU refers to the sharing of one or more physical CPUs by a plurality of logical CPUs, and switching the use of the shared physical CPUs among the plurality of logical CPUs.

The VMM 300 treats each logical CPU 120, 121, 220, 221 and the overhead processing of the VMM 300 as a single process, and performs scheduling of assigning a physical CPU to the process in the foregoing process units. Here, a process is a processing unit in which the physical CPU executes the programs. In order to realize the scheduling of the process, the process scheduling control unit 340 of the VMM 300 includes process control blocks 350, 351, . . . for each process, and includes scheduling control tables 360, 361, . . . for each physical CPU. The process control blocks 350, 351, . . . and the scheduling control tables 360, 361, . . . are stored in an area in the memory 420 that is assigned to the VMM. The process scheduling processing unit 370 controls the scheduling of the process by using the process control blocks and the process scheduling control tables.

Figure 2:
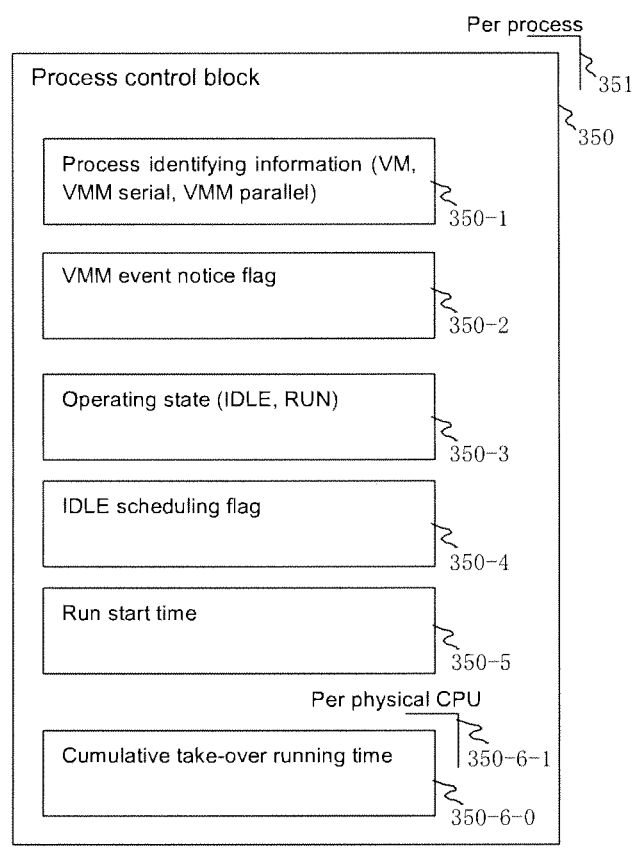
FIG. 2 is a configuration diagram of the process control block according to an embodiment.

FIG. 2 is a configuration diagram of the process control block according to an embodiment.

The process control blocks 350, 351, . . . respectively correspond to a process as a processing unit for executing programs, and are a data structure which embodies the process. The process provides an address space and a physical CPU in response to the execution of a program. A process includes logical CPU processes (350 to 353) that execute programs of a virtual computer and embody a virtual CPU of the VM, and VMM processes (354 to 356) for performing the overhead processing of the VMM 300 (refer to FIG. 4 and FIG. 5).

Here, the process control block 350 is explained, but the other process control blocks 351 and the like are also configured the same. The process control block 350 includes the fields of process identification information 350-1, a VMM event notification flag 350-2, an operating state 350-3, an IDLE schedule flag 350-4, a run start time 350-5, and one or more cumulative take-over running times 350-6-0, 350-6-1, . . . . The cumulative take-over running times 350-6-0, 350-6-1, . . . are prepared for each physical CPU.

The process identification information 350-1 indicates the type of process. The type of process can be broadly classified into the logical CPU process of the VM, or the VMM process of performing the overhead processing of the VMM 300. The VMM process is further classified into a serial attribute or a parallel attribute depending on the operational attribute of that process.

The serial attribute and the parallel attribute are attributes which indicate whether the VMM process will run simultaneously (in parallel) on a physical CPU that is separate from the physical CPU to execute the notification source process in response to the event notification. The serial attribute is an attribute to which corresponds a process that is issued only once from a notification source process, or a process that is periodically activated without the existence of a notification source process. The parallel attribute is an attribute to which corresponds a process in which an event notification is issued in continuation from a notification source process. For example, in a case where the logical CPU process of the VM receives an I/O command of a VGA drawing and an event notification of drawing processing is to be issued to the VMM process to perform the physical VGA drawing processing, the foregoing VMM process corresponds to a parallel attribute.

The VMM event notification flag 350-2 indicates whether an event notification of a VMM processing request has been issued to the VMM process.

The operating state 350-3 indicates whether the process corresponding to the process control block 350 is running on any physical CPU. The operating state 350-3 is RUN when the process is running on any physical CPU; that is, when the process is in a RUN state, and is IDLE when the process is not running on any physical CPU.

The IDLE schedule flag 350-4 indicates whether the process corresponding to the process control block 350 has been scheduled (assigned) to a physical CPU in an IDLE state.

The run start time 350-5 indicates the time that the processing corresponding to the process control block 350 was scheduled and started running on that physical CPU. The run start time 350-5 is used for calculating the running time of the process as described later.

The cumulative take-over running times 350-6-0, 350-6-1 are data for each physical CPU, and are a result of accumulating, from a predetermined point in time, the running time from the start to end of running in cases where the process took over and ran on a physical CPU in a RUN state. By referring to the cumulative take-over running times 350-6-0, 350-6-1, it is possible to confirm the cumulative take-over running time that the process for each physical CPU took over and ran on that physical CPU in a RUN state.

Figure 3:
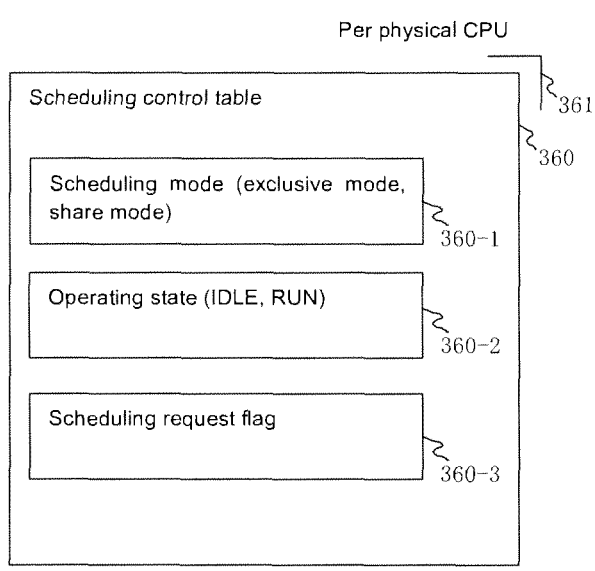
FIG. 3 is a configuration diagram of the scheduling control table according to an embodiment.

FIG. 3 is a configuration diagram of the scheduling control table according to an embodiment.

Scheduling control tables 360, 361, . . . are provided for each physical CPU, and store information related to the schedule of the physical CPU. Here, the scheduling control table 360 is explained, but the other scheduling control tables 361 and the like are also configured the same.

The scheduling mode 360-1 indicates a mode for scheduling the logical CPU process of the VM to the physical CPU. As the modes, there are the CPU exclusive mode and the CPU share mode described later.

The operating state 360-2 indicates whether a process is running on a physical CPU. When a process is running on a physical CPU, the state is RUN, and when a process is not running on a physical CPU, the state is IDLE. The scheduling request flag 360-3 indicates whether a request for switching the process is set in a physical CPU.

The CPU exclusive mode and the CPU share mode are now explained.

Figure 4:
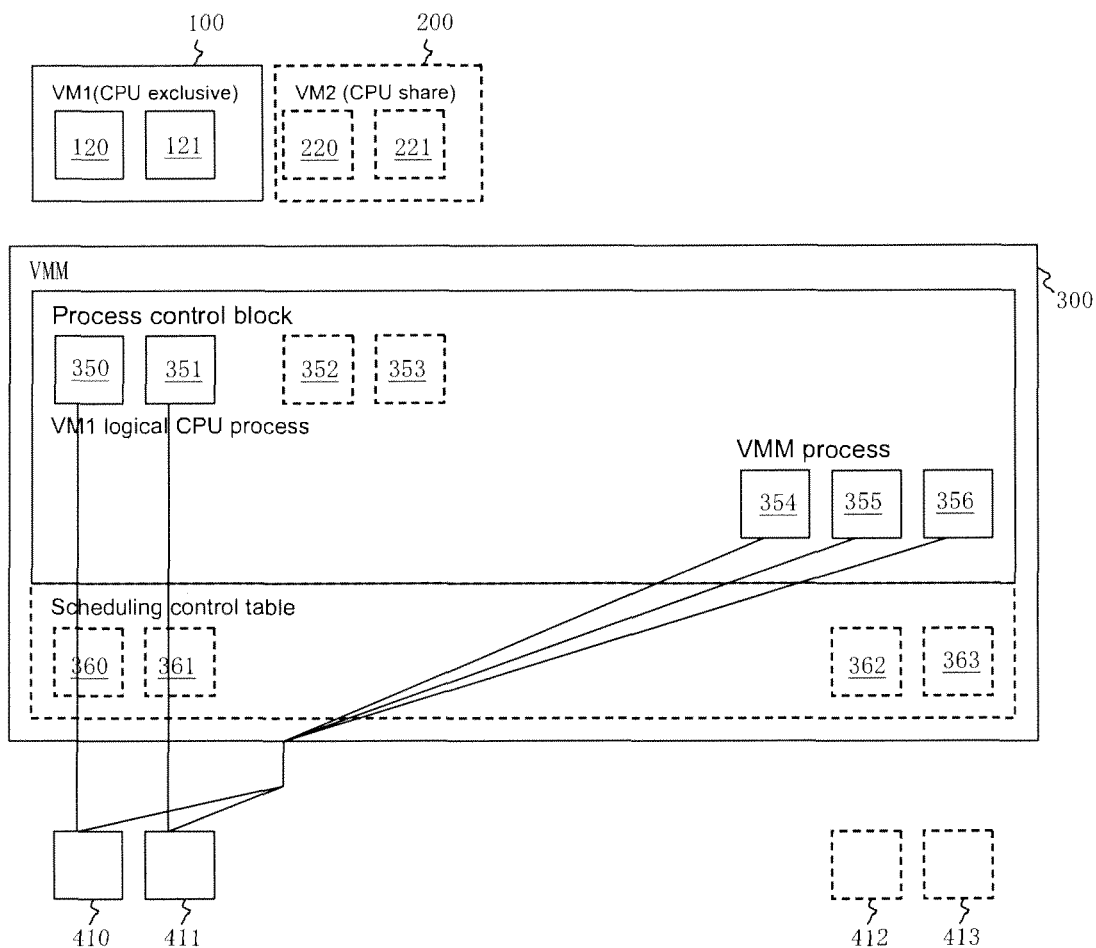
FIG. 4 is a diagram explaining the CPU exclusive mode of the process scheduling according to an embodiment.
Figure 5:
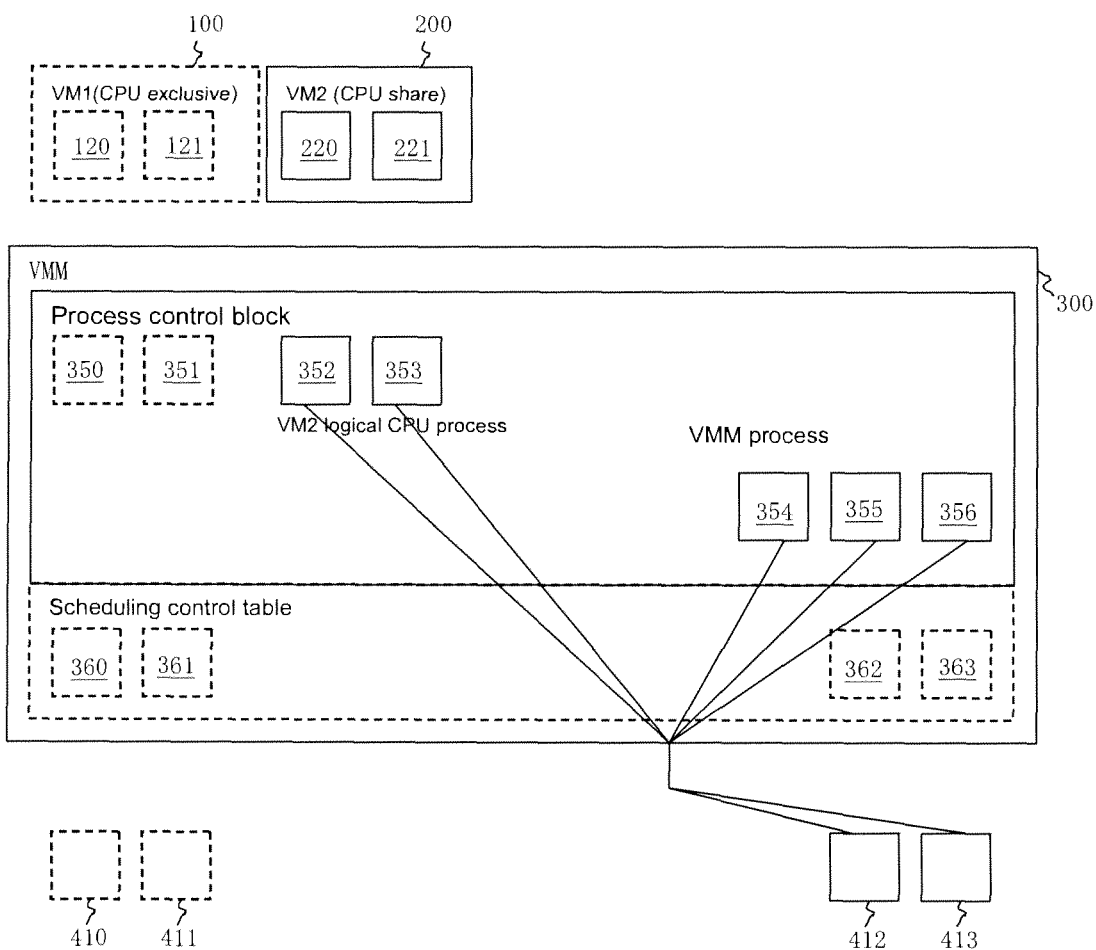
FIG. 5 is a diagram explaining the CPU share mode of the process scheduling according to an embodiment.

FIG. 4 is a diagram explaining the CPU exclusive mode of the process scheduling according to an embodiment. FIG. 5 is a diagram explaining the CPU share mode of the process scheduling according to an embodiment.

In the explanation of FIG. 4 and FIG. 5, the processes 350 and 351 corresponding to the logical CPUs 120, 121 of the VM 1 are set to be scheduled in the CPU exclusive mode, and the processes 352 and 353 corresponding to the logical CPUs 220, 221 of the VM 2 are set to be scheduled in the CPU share mode.

When scheduling is performed in the CPU exclusive mode, the logical CPU process is exclusively scheduled to one specific physical CPU. Specifically, as shown in FIG. 4, the logical CPU processes 350, 351 of the VM 1 of the CPU exclusive mode are each exclusively scheduled to the physical CPUs 410, 411. However, even in cases where scheduling is performed in the CPU exclusive mode, the VMM processes 354 to 356 that perform the overhead processing of the VMM are scheduled to the physical CPUs 410, 411 in preference to the logical CPU processes irrespective of the exclusive state of the physical CPU.

Meanwhile, when scheduling is performed in the CPU share mode, the logical CPU process is scheduled to one physical CPU among the physical CPUs excluding the physical CPU that is being used exclusively by the logical CPU of the CPU exclusive mode. Here, in FIG. 5, the physical CPUs 410, 411 are used in the CPU exclusive mode, and the physical CPUs 412, 413 are used in the CPU share mode. Accordingly, the logical CPU processes 352, 353 of the VM 2 of the CPU share mode are dynamically scheduled to the physical CPUs 412, 413. Note that, as with the case of the CPU exclusive mode, the VMM processes 354 to 356 that perform the overhead processing of the VMM are scheduled to the physical CPUs in preference to the logical CPU processes.

The processing operation of the computer according to an embodiment is now explained.

Figure 6:
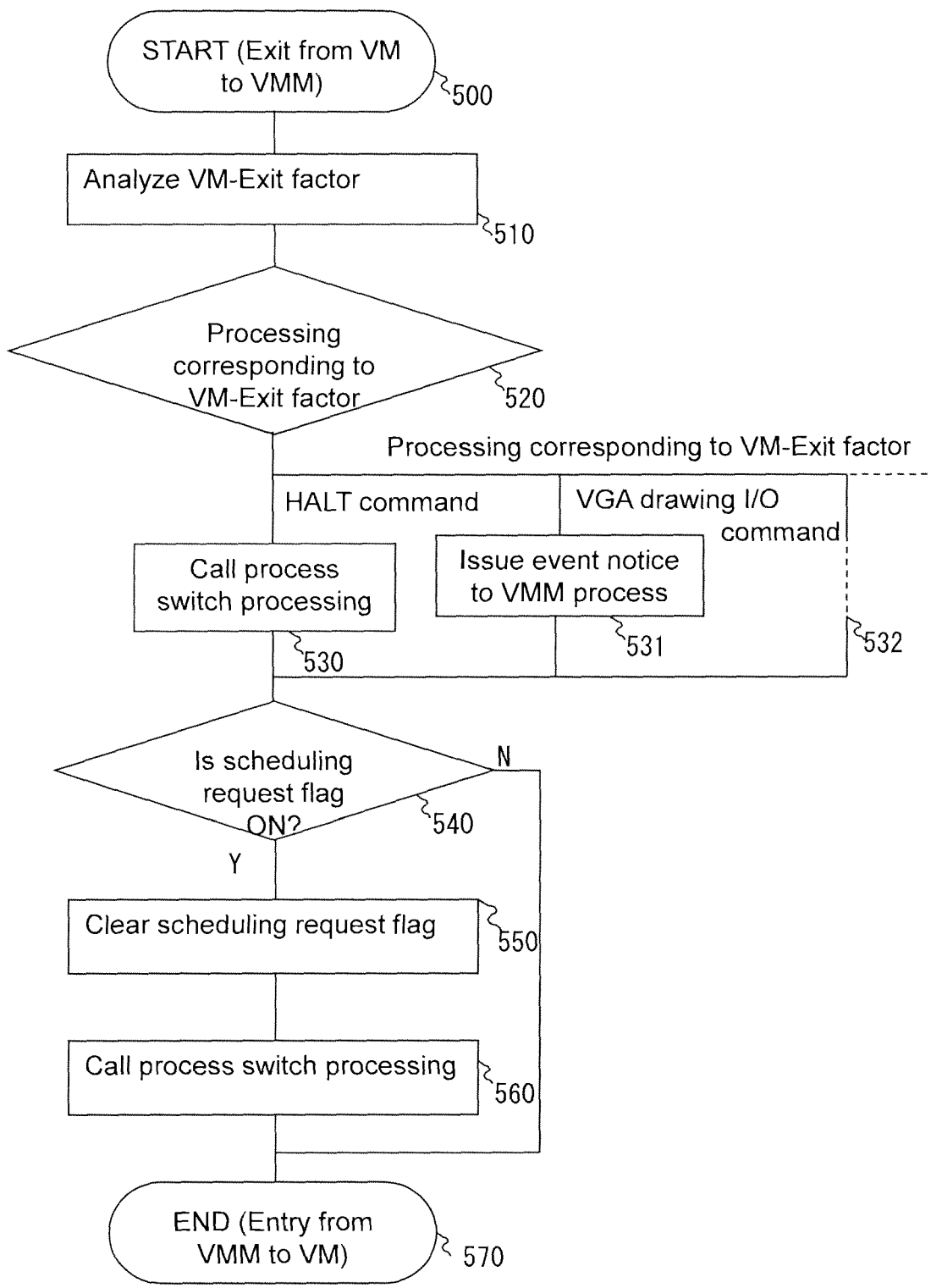
FIG. 6 is a flowchart showing the VMM internal processing of the VM process according to an embodiment.

FIG. 6 is a flowchart showing the VMM internal processing of the VM process according to an embodiment.

When a guest OS on a logical CPU of a VM (100 or 200) issues a privileged instruction of controlling the hardware resource, control is transferred to the VMM 300 (VM-Exit) based on the virtualization support mechanism of a physical CPU (one among 410 to 413) (step 500).

The command emulation unit 310 of the VMM 300 analyzes the factor of the VM-Exit (step 510), and executes processing corresponding to that factor (steps 520, 530 to 532). Processing corresponding to a factor is, for instance, when the factor is a HALT command for halting the operation of the logical CPU (HALT command), freeing the RUN state of the logical CPU process by the process scheduling processing unit 370 calling the process switch processing (step 530). Moreover, for instance, when the factor is an I/O command of VGA drawing (VGA drawing I/O command), an event notification of drawing processing is issued to the VMM process in which the command emulation unit 310 performs the physical VGA drawing processing (step 531).

When the processing corresponding to the VM-Exit factor is ended, the process scheduling processing unit 370 confirms whether the scheduling request flag (360-3 or the like) of the scheduling control tables 360, 361 and the like is ON in the physical CPU that is running the logical CPU process (step 540), and, when the scheduling request flag (360-3 or the like) is ON (step 540: Y), clears the scheduling request flag (step 550), calls the process switch processing (step 560), and advances the processing to step 570. Meanwhile, when the scheduling request flag is OFF (step 540: N), the process scheduling processing unit 370 does nothing, and advances the processing to step S570. Here, the scheduling request flag is ON, for instance, when the physical CPU is selected to run the VMM process in step 660 of the event notification processing (refer to FIG. 7).

In step 570, the VMM 300 transfers the control to the VM (VM-Entry).

Figure 7:
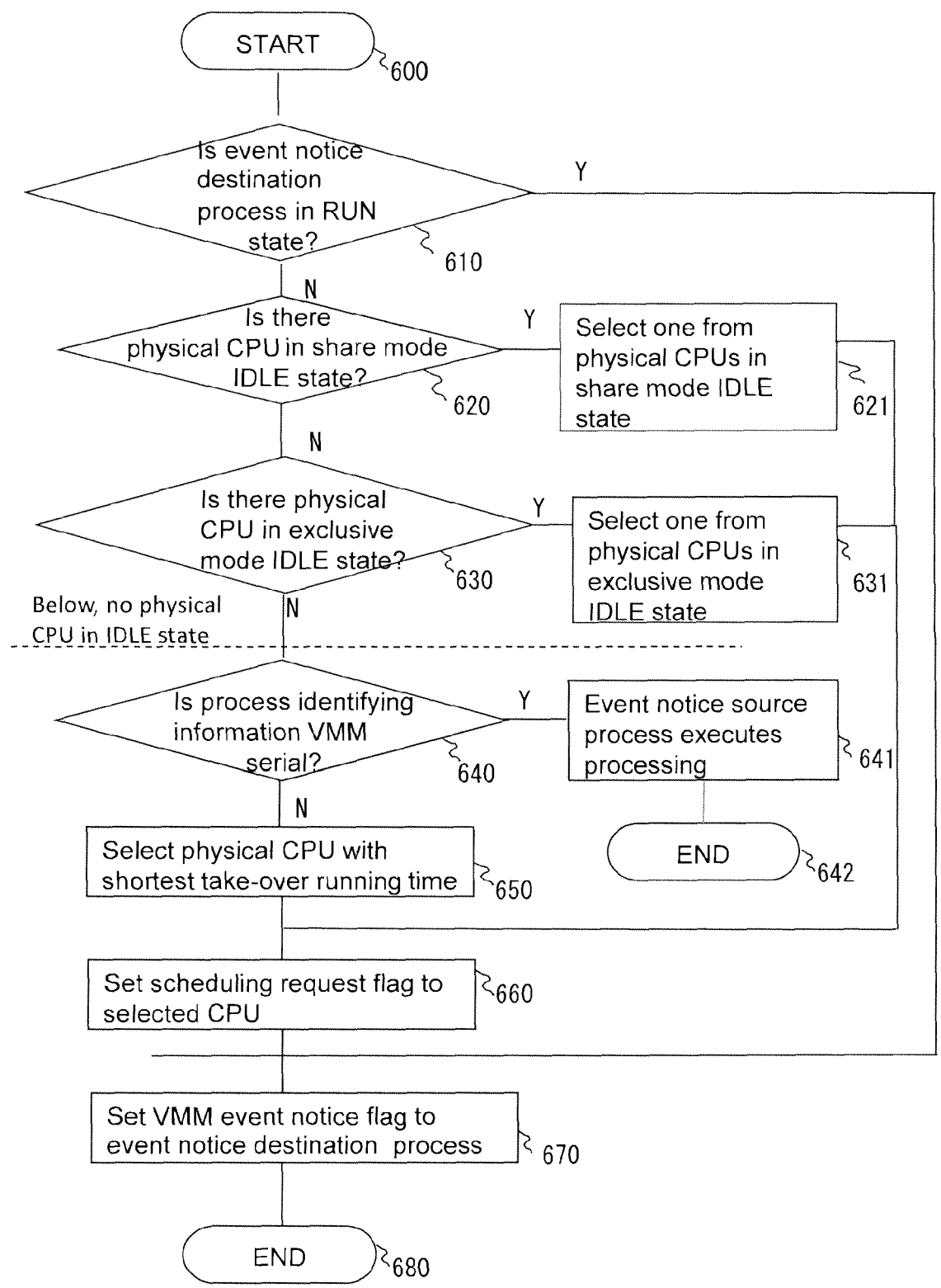
FIG. 7 is a flowchart showing the event notification processing according to an embodiment.

FIG. 7 is a flowchart showing the event notification processing according to an embodiment. FIG. 7 shows the event notification processing in the process of issuing an event notification to the VMM overhead processing. For example, the processing of issuing an event notification of the drawing processing of a physical VGA in step 531 of FIG. 6 corresponds to this event notification processing.

The process scheduling processing unit 370 refers to the operating state 350-3 of the access control block 350 corresponding to the VMM process (share processing process of the VMM) of the event notification destination, and determines whether the operating state 350-3 is in a RUN state (step 610). When the operating state 350-3 is in a RUN state (step 610: Y), since the VMM process is currently running on one of the physical CPUs, the VMM event notification flag 350-2 of the access control block 350 corresponding to the VMM process of the event notification destination is set to ON so that the operation of the VMM process of the event notification destination can be continued on that physical CPU (step 670), and the event notification processing is thereby ended.

Meanwhile, when the operating state 350-3 is not in a RUN state (step 610: N), the process scheduling processing unit 370 proceeds to the processing of selecting the physical CPU to run the VMM process of the event notification destination. In other words, the process scheduling processing unit 370 refers to the scheduling mode (360-1 or the like) and the operating state (360-2 or the like) from the scheduling control tables 360, 361, . . . of all physical CPUs, and determines whether there is a physical CPU in an IDLE state and of the CPU share mode (step 620).

As a result of the foregoing determination, when there is a physical CPU in an IDLE state and of the CPU share mode (step 620: Y), the process scheduling processing unit 370 selects, as the physical CPU to run the VMM process of the event notification destination, one physical CPU among the physical CPUs that are in an IDLE state and of the CPU share mode (step 621), and advances the processing to step 660.

Meanwhile, when there is no physical CPU in an IDLE state and of a CPU share mode (step 620: N), the process scheduling processing unit 370 determines whether there is a physical CPU in an IDLE state and of a CPU exclusive mode (step 630).

As a result of the foregoing determination, when there is a physical CPU in an IDLE state and of a CPU exclusive mode (step 630: Y), the process scheduling processing unit 370 selects, as the physical CPU to run the VMM process of the event notification destination, one physical CPU among the physical CPUs that are in an IDLE state and of the CPU exclusive mode (step 631), and advances the processing to step 660.

Here, the reason why a physical CPU of the CPU share mode is selected as the physical CPU to run the VMM in preference to a physical CPU of the CPU exclusive mode is because, as a result of running the VMM process of the event notification destination of a physical CPU in an exclusive mode, it is possible to prevent the interruption of the running of the VM that is exclusively assigned to that physical CPU.

Meanwhile, when there is no physical CPU in an IDLE state and of a CPU exclusive mode; that is, when there is no physical CPU in an IDLE state (step 630: N), since it is necessary to select one physical CPU to run the VMM process among the physical CPUs in a RUN state, the process scheduling processing unit 370 refers to the process identification information (350-1 or the like) of the process control block (350 or the like) corresponding to the VMM process of the event notification destination, and determines whether the process identification information is a serial attribute (step 640).

When the process identification information is a serial attribute (step 640: Y), there is no possibility that the event notification will occur in continuation, there is no need to request the overhead processing of the VMM to another physical CPU. Thus, the process scheduling processing unit 370 does not issue an event notification to the VMM process and enables the request source process to execute the overhead processing of the VMM (step 641), and thereby ends the processing (step 642). It is thereby possible to reduce costs for switching the process which will arise as a result of causing the overhead processing of the VMM to be run by another physical CPU.

Meanwhile, when the process identification information is a parallel attribute (step 640: N), the process scheduling processing unit 370 refers to the cumulative take-over running time (for instance, 350-6-0, 350-6-1 or the like) of the respective physical CPUs of the process control block (350 or the like) corresponding to the VMM process of the event notification destination, selects the physical CPU with the smallest cumulative take-over running time as the physical CPU to run the VMM process of the event notification destination (step 650), and advances the processing to step 660.

In step 660, since the physical CPU to run the VMM process has been selected, the process scheduling processing unit 370 sets the scheduling request flag (360-3 or the like) of the scheduling control table (one of 360, 361, . . . ) corresponding to the selected physical CPU to ON. Consequently, in step 560 of FIG. 6, as a result of the process switch processing being called, the running of the VMM process is started with the selected physical CPU.

Subsequently, the process scheduling processing unit 370 sets the VMM event notification flag (350-2 or the like) of the process control block (350 or the like) corresponding to the VMM process of the event notification destination to ON (step 670), and thereby ends the event notification processing (step 680).

Figure 8:
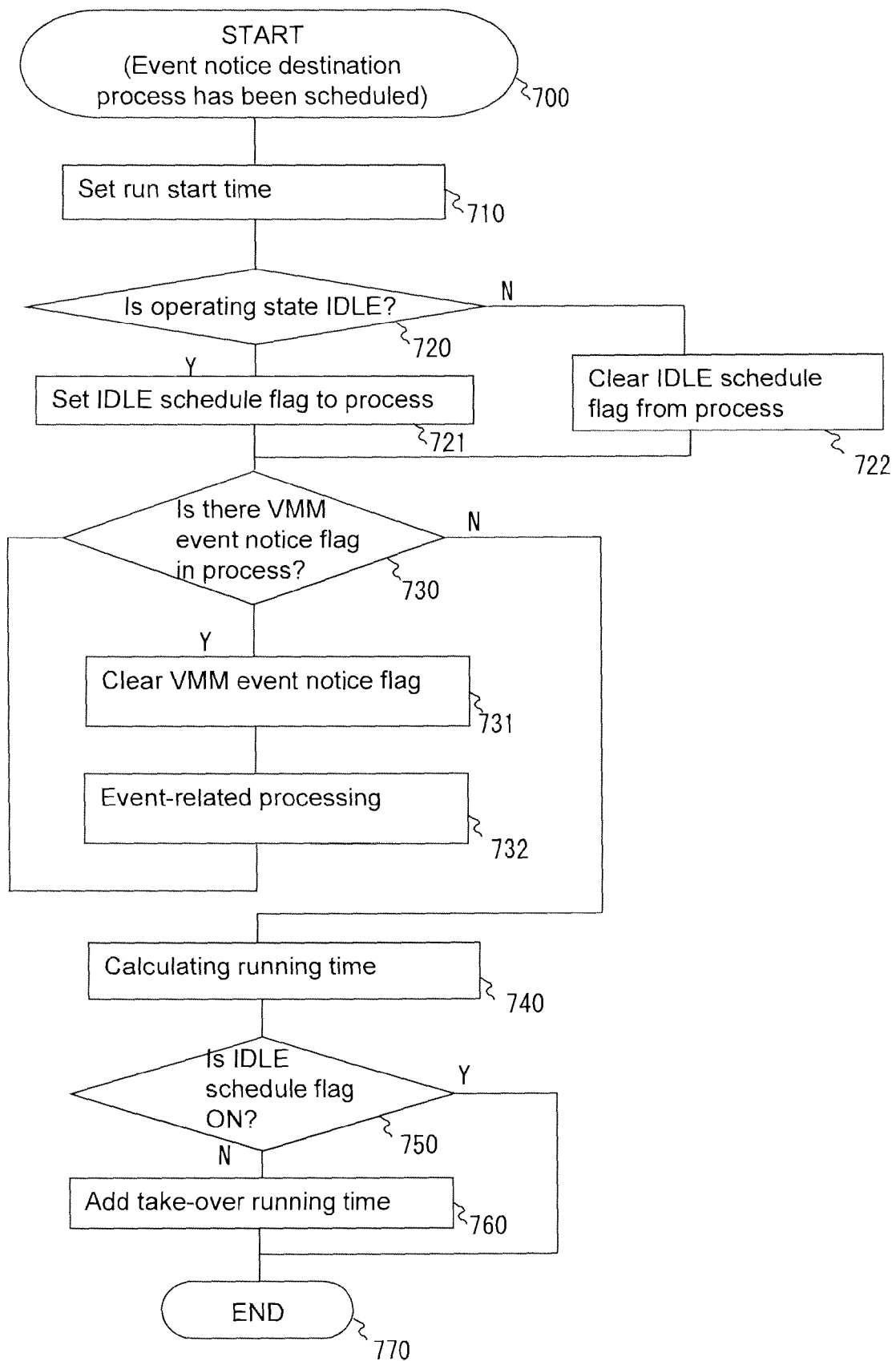
FIG. 8 is a flowchart showing the processing of the event notification destination VMM process according to an embodiment.

FIG. 8 is a flowchart showing the processing in the event notification destination VMM process according to an embodiment.

When the running of the VMM processes is started on the selected physical CPU based on the call of the process switch processing in step 530, step 560 of FIG. 6 (step 700), the process scheduling processing unit 370 sets the current time of that point in time to the run start time 350-5 of the process control block (350 or the like; explained as 350 in this processing) corresponding to the VMM process (step 710).

Subsequently, the process scheduling processing unit 370 refers to the operating state (360-2) of the scheduling control table (any one of 360, 361, . . . ) of the physical CPU on which the running of the VMM process was started, determines whether the operating state is an IDLE state (step 720), and, as a result of the foregoing determination, when the operating state is an IDLE state (step 720: Y), sets the IDLE schedule flag 350-4 of the process control block 350 corresponding to the VMM process to ON (step 721). Meanwhile, when the operating state is not an IDLE state (step 720: N), the process scheduling processing unit 370 clears the IDLE schedule flag 350-4 of the process control block 350 (step 722).

Subsequently, the VMM process determines whether VMM event notification flag 350-2 of its process control block 350 is set to ON (step 730), and, as a result of the determination, when the VMM event notification flag 350-2 is set to ON (step 730: Y), clears the VMM event notification flag 350-2 (step 731), executes the processing corresponding to the event (step 732), and advances the processing to step 730. Here, when the VMM process is a parallel attribute, where are cases where, while the processing corresponding to the event is being executed, the processing of step 660 of FIG. 7 is executed and the VMM event notification flag 350-2 of its process control block 350 is set to ON once again. Accordingly, the VMM process repeatedly executes steps 731, 732 when, as a result of the determination in step 730, the VMM event notification flag 350-2 is set to ON.

Meanwhile, as result of the determination in step 730, when the VMM event notification flag 350-2 is not set to ON (step 730: N), the process scheduling processing unit 370 calculates the running time of the VMM process based on the run start time 350-5 of the process control block 350 of the VMM process, and the current time (step 740).

Subsequently, the process scheduling processing unit 370 refers to the IDLE schedule flag 350-4 of the process control block 350 of the VMM process, determines whether the IDLE schedule flag 350-4 is ON (step 750), and, when the IDLE schedule flag 350-4 is ON (step 750: Y), since the VMM process is not running on a physical CPU in a RUN state, ends the processing as is (step 770). Meanwhile, when the IDLE schedule flag 350-4 is OFF (step 750: N), it is determined that the VMM process was running on a physical CPU in a RUN state, and the running time calculated in step 740 is added to the cumulative take-over running time (any one of 350-6-0, 350-6-1, . . . ) corresponding to the physical CPU that was run (step 760), and the processing is ended (step 770). Consequently, it is possible to appropriately add, to the cumulative take-over running time, the running time in cases where the VMM process had run on a physical CPU in a RUN state.

The effect according to this embodiment is now explained with reference to FIG. 9.

FIG. 9 (a2) shows an example of a case where, when an event request occurs similar to FIG. 9 (a1), the scheduling operation of selecting the physical CPU based on the cumulative take-over running time that the overhead processing of the VMM had run on a physical CPU in a RUN state according to this embodiment. Moreover, FIG. 9 (b2) shows an example of a case where, when an event request occurs similar to FIG. 9 (b1), the scheduling operation of selecting the physical CPU for running the overhead processing of the VMM by using the attribute of the overhead processing of the VMM according to this embodiment.

With the scheduling operation shown in FIG. 9 (a1) which uses the time sharing system and information related to the number of times that the overhead processing of the VMM had run on a physical CPU in a RUN state, while the uniformity of time of using the physical CPU resource can be secured, costs for switching the processing of the VM and the overhead processing of the VMM and costs for succeeding the overhead processing of the VMM to the subsequent physical CPU will arise as described above.

Meanwhile, the scheduling operation according to this embodiment is as indicated in FIG. 9 (a2).

In other words, the overhead processing of the VMM performed in response to the event notification 810 (request 1) is executed by the physical CPU 0, and continued until the overhead processing is ended. Moreover, since the running of the overhead processing of the VMM performed in response to the event notification 811 (request 2) is started with the physical CPU with the smallest cumulative take-over running time, such running is started with the physical CPU 1, and continued until the overhead processing is ended. Moreover, since the running of the overhead processing of the VMM performed in response to the event notification 812 (request 3) is started with the physical CPU with the smallest cumulative take-over running time, such running is started with the physical CPU 2, and continued until the overhead processing is ended. Moreover, since the running of the overhead processing of the VMM performed in response to the event notification 813 (request 4) is started with the physical CPU with the smallest cumulative take-over running time, such running is started with the physical CPU 0, and continued until the overhead processing is ended. Moreover, since the running of the overhead processing of the VMM performed in response to the event notification 814 (request 5) is started with the physical CPU with the smallest cumulative take-over running time, such running is started with the physical CPU 2, and continued until the overhead processing is ended.

As described above, according to the scheduling operation of this embodiment, the overhead processing of the VMM that received the event notifications 810 to 814 starts running on the physical CPU with the smallest cumulative take-over running time, and continues running until the processing is completed. It is thereby possible to reduce the cost that become a problem in FIG. 9 (a1). Note that, upon comparing FIG. 9 (a1) and FIG. 9 (a2), while it may appear that the scheduling operation shown in FIG. 9 (a1) is superior from the perspective of uniformity of time of using the physical CPU resource, this is because these diagrams only show a short time range, and upon viewing a longer time range, the same effect as FIG. 9 (a1) can be obtained even with the scheduling operation of FIG. 9 (a2).

With the scheduling operation shown in FIG. 9 (b1), since the overhead processing of the VMM is running on the physical CPU 0 at the timing that the VM issues the event notification 904, there are cases where the issuance of the event notification and the processing are delayed as described above.

Meanwhile, the scheduling operation according to this embodiment is as indicated in FIG. 9 (b2).

Here, with this embodiment, a serial attribute is added to the process of the overhead processing of the VMM that is requested in the event notifications 910 to 912, and a parallel attribute is added to the process of the overhead processing of the VMM that is requested in the event notifications 913 to 915 and managed since the event notifications occur in continuation.

Since the overhead processing of the VMM performed in response to the event notification 910 (request 1) has a serial attribute, such overhead processing is executed by the physical CPU 0, and continued until the overhead processing is ended. Moreover, since the overhead processing of the VMM performed in response to the event notification 911 (request 2) has a serial attribute, such overhead processing is executed without changing the physical CPU, and continued until the overhead processing is ended. Moreover, since the overhead processing of the VMM performed in response to the event notification 912 (request 3) has a serial attribute, such overhead processing is executed without changing the physical CPU, and continued until the overhead processing is ended.

Subsequently, since the overhead processing of the VMM performed in response to the event notification 913 (request 4) has a parallel attribute, the running thereof is started on the physical CPU with the smallest cumulative take-over running time; that is, started on the physical CPU 1, and continued until the overhead processing is ended. Here, since the physical CPU 0 to issue the event notification 914 (request 5) is not executing the overhead processing of the VMM, the event notification 914 can be issued without delay. With the overhead processing of the VMM performed in response to the event notification 914 (request 5), since the overhead processing of the VMM corresponding to the request 4 is running on the physical CPU 1 at such point in time, such overhead processing will continue running on the physical CPU 1 after the overhead processing corresponding to the request 4 is ended. In addition, since the physical CPU 0 to issue the event notification 915 (request 6) is not executing the overhead processing of the VMM, the event notification 915 can be issued without delay. With the overhead processing of the VMM performed in response to the event notification 915 (request 6), since the overhead processing of the VMM corresponding to the request 5 is running on the physical CPU 1 at such point in time, such overhead processing will continue running on the physical CPU 1 after the overhead processing corresponding to the request 5 is ended.

As described above, according to the scheduling operation of this embodiment, a physical CPU that is separate from the event notification source is selected without fail for the VMM overhead processing having a parallel attribute as with the event notifications 913 to 915, and the issuance of the event and the processing of the event can be executed in parallel. Moreover, since the overhead processing of the VMM having a serial attribute as with the event notifications 910 to 912 is processed with a physical CPU of the event notification source, it is possible to reduce the costs for switching the processing of the VM and the VMM overhead processing.

According to the foregoing embodiment, the costs related to the overhead processing of the VMM can be reduced. In particular, the improvement in performance resulting from the efficient operation of the resources of the physical CPUs can be expected in the overhead processing of the VMM that is activated upon receiving an event notification from a VM such as a network or a VGA and which is executed in parallel, and the applicable scope of the computer can be expanded.

While the embodiments were explained above, the present invention is not limited to these embodiments, and it goes without saying that this invention may be variously modified to the extent that such modification does not deviate from the gist of the invention.

What is claimed is:

1. A computer comprising:
a plurality of physical CPUs;
a plurality of virtual computers which are configured to execute predetermined processing and to which one of the plurality of physical CPUs is assigned; and
a virtual computer control component configured to manage the plurality of virtual computers, the virtual computer control component being able to cause the plurality of physical CPUs to execute overhead processing which is required by the plurality of virtual computers,
wherein the virtual computer control component is configured to:
manage the overhead processing by associating the overhead processing with identification information indicating whether the overhead processing is processing that is requested in continuation during processing of the virtual computer, or processing that is not requested in continuation; and
(A) upon causing a physical CPU to execute the overhead processing, measure a run time used by the physical CPU to execute the overhead processing;
(B) manage a cumulative run time for each of the physical CPUs, wherein a cumulative run time of a physical CPU is an accumulation of the run time on that physical CPU;
(C) upon causing the overhead processing to be executed, when the identification information associated with the overhead processing indicates that the overhead processing is processing that is requested in continuation during processing of the virtual computer, select a physical CPU which is not executing processing of the virtual computer in which the cumulative run time is smallest as the physical CPU to execute the overhead processing; and
(D) upon causing the overhead processing to be executed, when the identification information associated with the overhead processing indicates that the overhead processing is processing that is not requested in continuation during processing of the virtual computer, select a physical CPU which is executing processing of the virtual computer that has requested the overhead processing as the physical CPU to execute the overhead processing.

2. A computer according to claim 1,
wherein the virtual computer control component is configured to, upon causing the overhead processing to be executed, execute the (C) or the (D) based on the identification information of the overhead processing when the overhead processing is not being executed by any physical CPU, and when there is no physical CPU that is not executing processing of the virtual computer.

3. A computer according to claim 2,
wherein the virtual computer control component is configured to cause the physical CPU, which has been selected as the physical CPU to execute the overhead processing, to execute the overhead processing.

4. A computer according to claim 3,
wherein the virtual computer control component is configured to, when the physical CPU which has been selected as the physical CPU to execute the overhead processing is executing processing of the virtual computer, measure a run time used by the physical CPU to execute the overhead processing, and add the measured run time to the cumulative run time of the physical CPU.

5. A computer according to claim 4,
wherein the physical CPU is set to a mode of either an exclusive mode in which one virtual computer can exclusively use the physical CPU, or a share mode in which the plurality of virtual computers can share and use the physical CPU, and
wherein, when there are a physical CPU which is in the exclusive mode and which is not executing processing of the virtual computer and a physical CPU which is in the share mode and which is not executing processing of the virtual computer, the virtual computer control component is configured to preferentially select a physical CPU which is in the share mode and which is not executing processing of the virtual computer as the physical CPU to execute the overhead processing.

6. A non-transitory computer-readable storage medium having stored thereon processor-executable instructions configured to cause a virtualization mechanism to be executed by a computer comprising a plurality of physical CPUs, and a plurality of virtual computers which are configured to execute predetermined processing and to which one of the plurality of physical CPUs is assigned, the computer being able to cause the plurality of physical CPUs to execute overhead processing which is required by the plurality of virtual computers,
wherein the virtualization mechanism is configured to cause the computer to:
manage the overhead processing by associating the overhead processing with identification information indicating whether the overhead processing is processing that is requested in continuation during processing of the virtual computer, or processing that is not requested in continuation; and
(A) upon causing a physical CPU to execute the overhead processing, measure a run time used by the physical CPU to execute the overhead processing;

(B) manage a cumulative run time for each of the physical CPUs, wherein a cumulative run time of a physical CPU is an accumulation of the run time on that physical CPU;

(C) upon causing the overhead processing to be executed, when the identification information associated with the overhead processing indicates that the overhead processing is processing that is requested in continuation of the virtual computer, select a physical CPU which is not executing processing of the virtual computer in which the cumulative run time is smallest as the physical CPU to execute the overhead processing; and (D) upon causing the overhead processing to be executed, when the identification information associated with the overhead processing indicates that the overhead processing is processing that is not requested in continuation during processing of the virtual computer, select a physical CPU which is executing processing of the virtual computer that has requested the overhead processing as the physical CPU to execute the overhead processing.

7. The non-transitory computer-readable storage medium according to claim 6,
wherein the virtualization mechanism is configured to cause the computer to:
upon causing the overhead processing to be executed, execute the (C) or the (D) based on the identification information of the overhead processing when the overhead processing is not being executed by any physical CPU, and when there is no physical CPU that is not executing processing of the virtual computer.

8. The non-transitory computer-readable storage medium according to claim 7,
wherein the virtualization mechanism is configured to cause the computer to:
when the physical CPU which has been selected as the physical CPU to execute the overhead processing is executing processing of the virtual computer, measure a run time used by the physical CPU to execute the overhead processing, and add the measured run time to the cumulative run time of the physical CPU.

9. A scheduling method in a computer comprising a plurality of physical CPUs, and a plurality of virtual computers which are configured to execute predetermined processing and to which one of the plurality of physical CPUs is assigned, the computer being able to cause the plurality of physical CPUs to execute overhead processing which is required by the plurality of virtual computers, the scheduling method comprising the steps of:

managing the overhead processing by associating the overhead processing with identification information indicating whether the overhead processing is processing that is requested in continuation during processing of the virtual computer, or processing that is not requested in continuation; and (A) upon causing a physical CPU to execute the overhead processing, measuring a run time used by the physical CPU to execute the overhead processing;

(B) manage a cumulative run time for each of the physical CPUs, wherein a cumulative run time of a physical CPU is an accumulation of the run time on that physical CPU;

(C) upon causing the overhead processing to be executed, when the identification information associated with the overhead processing indicates that the overhead processing is processing that is requested in continuation during processing of the virtual computer, selecting a physical CPU which is not executing processing of the virtual computer in which the cumulative run time is smallest as the physical CPU to execute the overhead processing; and (D) upon causing the overhead processing to be executed, when the identification information associated with the overhead processing indicates that the overhead processing is processing that is not requested in continuation during processing of the virtual computer, selecting a physical CPU which is executing processing of the virtual computer that has requested the overhead processing as the physical CPU to execute the overhead processing.

10. A scheduling method according to claim 9, further comprising the step of:
upon causing the overhead processing to be executed, executing the (C) or the (D) based on the identification information of the overhead processing when the overhead processing is not being executed by any physical CPU, and when there is no physical CPU that is not executing processing of the virtual computer.

11. A scheduling method according to claim 10, further comprising the step of:
when the physical CPU which has been selected as the physical CPU to execute the overhead processing is executing processing of the virtual computer, measuring a run time used by the physical CPU to execute the overhead processing, and adding the measured run time to the cumulative run time of the physical CPU.

* * * * *